US010376972B2

(12) United States Patent
Pollard

(10) Patent No.: US 10,376,972 B2
(45) Date of Patent: Aug. 13, 2019

(54) POROUS BEARING FOR A BAND SAW, A BAND SAW AND A METHOD OF OPERATING A BAND SAW

(71) Applicant: Bark Delivered Inc., Appling, GA (US)

(72) Inventor: Levi A. Pollard, Appling, GA (US)

(73) Assignee: BARK DELIVERED INC., Appling, GA (US)

(*) Notice: Subject to any disclaimer, the term of this patent is extended or adjusted under 35 U.S.C. 154(b) by 17 days.

(21) Appl. No.: 15/897,752

(22) Filed: Feb. 15, 2018

(65) Prior Publication Data
US 2018/0236573 A1 Aug. 23, 2018

Related U.S. Application Data

(60) Provisional application No. 62/462,112, filed on Feb. 22, 2017.

(51) Int. Cl.
B23D 55/04 (2006.01)
B23D 59/00 (2006.01)
B23D 59/04 (2006.01)
B23D 55/08 (2006.01)
B23D 55/10 (2006.01)
B27B 13/12 (2006.01)
B27B 15/04 (2006.01)
B27B 15/08 (2006.01)

(52) U.S. Cl.
CPC ......... *B23D 55/043* (2013.01); *B23D 55/082* (2013.01); *B23D 55/10* (2013.01); *B23D 59/001* (2013.01); *B23D 59/04* (2013.01); *B27B 13/12* (2013.01); *B27B 15/04* (2013.01); *B27B 15/08* (2013.01)

(58) Field of Classification Search
CPC ...... B23D 55/10; B23D 59/04; B23D 59/001; B23D 59/002; B23D 55/043; B23D 55/082; B27B 13/12; B27B 15/04; B27B 15/08; Y10T 83/7258; Y10T 83/7226
See application file for complete search history.

(56) References Cited

U.S. PATENT DOCUMENTS

| 1,125,738 A | 1/1915 | Schmelzle |
| 1,530,682 A | 3/1925 | Lyman |

(Continued)

FOREIGN PATENT DOCUMENTS

| CA | 2932091 A1 * | 12/2016 | ........... B23D 59/002 |
| DE | 2902216 A  * | 8/1979 | |
| DE | 2940820 A1 * | 4/1981 | ............. B23D 55/10 |

OTHER PUBLICATIONS www.newwayairbearings.com, New Way Air Bearings, pp. 1-6, 2018.

(Continued)

*Primary Examiner* — Jennifer B Swinney
(74) *Attorney, Agent, or Firm* — Jeffrey S. Melcher; Melcher Patent Law PLLC

(57) ABSTRACT

Provided are a porous media bearing for a band saw, a band saw for cutting cant and a method of cutting cant using the band saw. The band saw has a continuous loop blade supported by a drive wheel and first and second support arms having porous media bearings. A location of a blade cutting section, an angle of the blade in relation to the cant being cut, and tension on the blade can be adjusted by moving the first and second support arms.

24 Claims, 5 Drawing Sheets

(56) References Cited

U.S. PATENT DOCUMENTS

| | | | |
|---|---|---|---|
| 2,511,989 A | 6/1950 | Nardi | |
| 3,452,734 A * | 7/1969 | Cleland | B23D 55/06 125/21 |
| 3,465,794 A * | 9/1969 | McLauchlan | B23D 55/065 83/420 |
| 3,958,332 A | 5/1976 | Gates | |
| 4,061,066 A | 12/1977 | Mueller | |
| 4,336,731 A * | 6/1982 | Eklund | B23D 53/00 83/74 |
| 5,557,989 A | 9/1996 | Smith | |
| 5,806,401 A | 9/1998 | Rajala | |
| 5,819,613 A | 10/1998 | Wilson | |
| 6,745,644 B1 | 6/2004 | Iseli | |
| 8,151,680 B2 | 4/2012 | Pollard | |
| 2009/0126549 A1 | 5/2009 | Dietz | |
| 2015/0158097 A1* | 6/2015 | Myrfield | B23D 55/046 83/13 |

OTHER PUBLICATIONS www.ibspe.com, IBS Engineering, pp. 1-2, Feb. 15, 2018.
www.nelsonair.com, PI Nelson AIr, pp. 1-2, Feb. 15, 2018.
International Search Report and Written Opinion dated May 14, 2018 in PCT/US2018/18472, pp. 1-12.

* cited by examiner

POROUS BEARING FOR A BAND SAW, A BAND SAW AND A METHOD OF OPERATING A BAND SAW

FIELD OF THE INVENTION

The present invention relates to an improvement in a band saw apparatus in which a location of a blade cutting section, an angle of the blade in relation to the cant being cut, and tension on the blade can be adjusted by moving first and second support arms having porous bearings.

BACKGROUND OF THE INVENTION

In the lumber industry, a number of apparatuses have been employed to cut timber (hereinafter referred to as a cant) into usable pieces for subsequent operations or usage. Frequently, a wood cant must be cut into fairly thin but elongated pieces and typically band saws are used to accomplish this operation. In conventional band saws, such as represented by U.S. Pat. No. 4,061,066, issued Dec. 6, 1977, U.S. Pat. No. 6,745,644, issued Jun. 8, 2004, U.S. Pat. No. 5,557,989, issued Sep. 24, 1996 and U.S. Pat. No. 5,819,613, issued Oct. 13, 1998, an endless band saw is looped around an idler pulley wheel and a drive wheel which is motor driven and operated at high speed to rotate the drive wheel and, hence, the band saw over the pulley wheel while cants or wooden pieces are transported by a conveyor or manually against the cutting teeth of the band saw. Tension on the band saw is maintained by adjusting the distance between the central axis of rotation of the pulley and the drive wheel. The maintenance of the proper tension in the band saw loop is critical to efficient cutting operation and the avoidance of damage to the band saw loop. In particular, an improper low tension will result in wastage of the wood product since vibration of the loop will increase the size of the kerfs or cut made in the wood and can lead to breakage of the band itself.

My earlier U.S. Pat. No. 8,151,680 (Pollard) discloses an air bearing being use in a band saw. Different sized bearings are used to provide different locations for the cutting sections of the band saw.

SUMMARY OF THE INVENTION

An objective of the invention is to provide an improved band saw.

In the present invention, the rotatable idler pulley can be eliminated and replaced by first and second low friction guide members (support arms) that have porous media bearings for individual band saw loops. The drive wheel can be formed with a corresponding number of tracks to enhance guidance of the band saw or saws. In addition, the drive wheel may be provided with sprocket teeth on the track surfaces to cooperate with sprocket openings formed along one edge of the band saw opposite the edge on which the cutting teeth are formed. The band saw blade is floated off of the porous media bearings by a lubricant under pressure.

One advantage of the arrangement of the present invention is the simplification of a band saw apparatus since the guide track surface will require substantially less maintenance then the idler pulley currently in use. Also, typically the idler pulleys presently in use are relatively heavy as compared with the guide track surface used in the present invention. The weight saving may significantly extend the life of the drive motor for the drive pulley.

Another advantage of the present invention is that the location of the cutting section of the blade can be adjusted by moving the first and second support arms in the horizontal direction or plane. The tension on the blade can be adjusted by moving the first and second support arms in opposing directions in the vertical direction or plane. The angle of the blade can be adjusted by moving the first and second support arms in opposing directions in the horizontal direction or plane. Centering of the blade on the support arms can be adjusted by adjusting the tilt of the first and second support arms in relation to the drive wheel. The same size blades (i.e. having the same overall length) can be utilized and the location of the cutting section of the blade can be easily be adjusted without having to utilize different size drive wheels. Thus, the claimed invention saves significant cost by being able to utilize one size blade and one size drive wheel. The adjustments to the blade cutting location, angle of cut, tension and centering can be conducted in real time to provide precise, multiple, simultaneous cuts in the cant.

The above objectives and other objectives can be obtained by a saw configured to cut cant comprising at least one band saw comprising:

a motor;

at least one drive wheel constructed to be driven by the motor;

at least one first support arm comprising a first porous media bearing;

at least one second support arm comprising a second porous media bearing;

at least one first locking structure connecting the first support arm to the support, the first locking structure constructed to move the first support arm in a horizontal direction and a vertical direction when unlocked and lock the first support in a desired position when locked;

at least one second locking structure connecting the second support arm to the support, the second locking structure constructed to move the second support arm in the horizontal direction and the vertical direction when unlocked and lock the second support in a desired position when locked; and at least one continuous loop band saw blade supported by the drive wheel, the first support arm and the second support arm, wherein a cutting section of the band saw blade being defined between the first and second support arms, the cutting section being where cant is cut by the band saw blade, the first porous media bearing having a curved surface for changing a direction of the band saw blade during use, the second porous media bearing having a curved surface for changing a direction of the band saw blade during use, a location of the cutting section can be adjusted by moving the first and second support arms in the horizontal direction substantially perpendicular to a direction the blade travels in the cutting section, and a tension on the band saw blade can be adjusted by moving the first and second support arms in opposing directions in the vertical direction so that the tension can be increased by moving the first and second support arms to be farther apart and the tension can be decreased by moving the first and second support arms closer together.

The above objectives and other objectives can be obtained by a method of using the band saw to cut cant comprising:

supplying pressurized lubricant to the first and second porous media bearings; and conveying cant on the conveyor, and operating the at least one band saw to cut the cant.

The foregoing and other advantages will become apparent as consideration is given to the follow detailed description taken in conjunction with the accompanying drawings, in which:

DETAILED DESCRIPTION OF THE INVENTION

Figure 1:
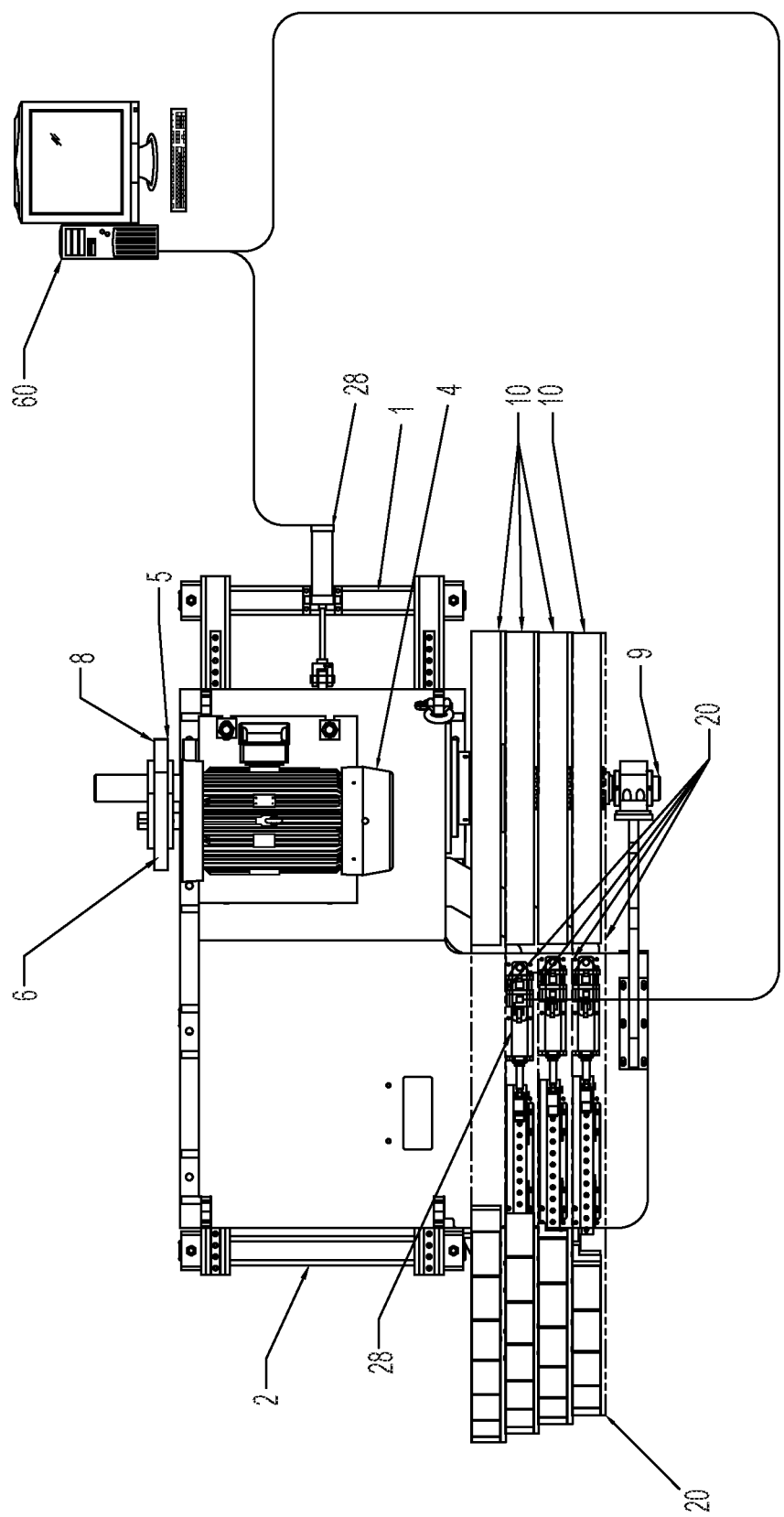
FIG. 1 illustrates a top view of exemplary band saws 1 according to the present invention.
Figure 2:
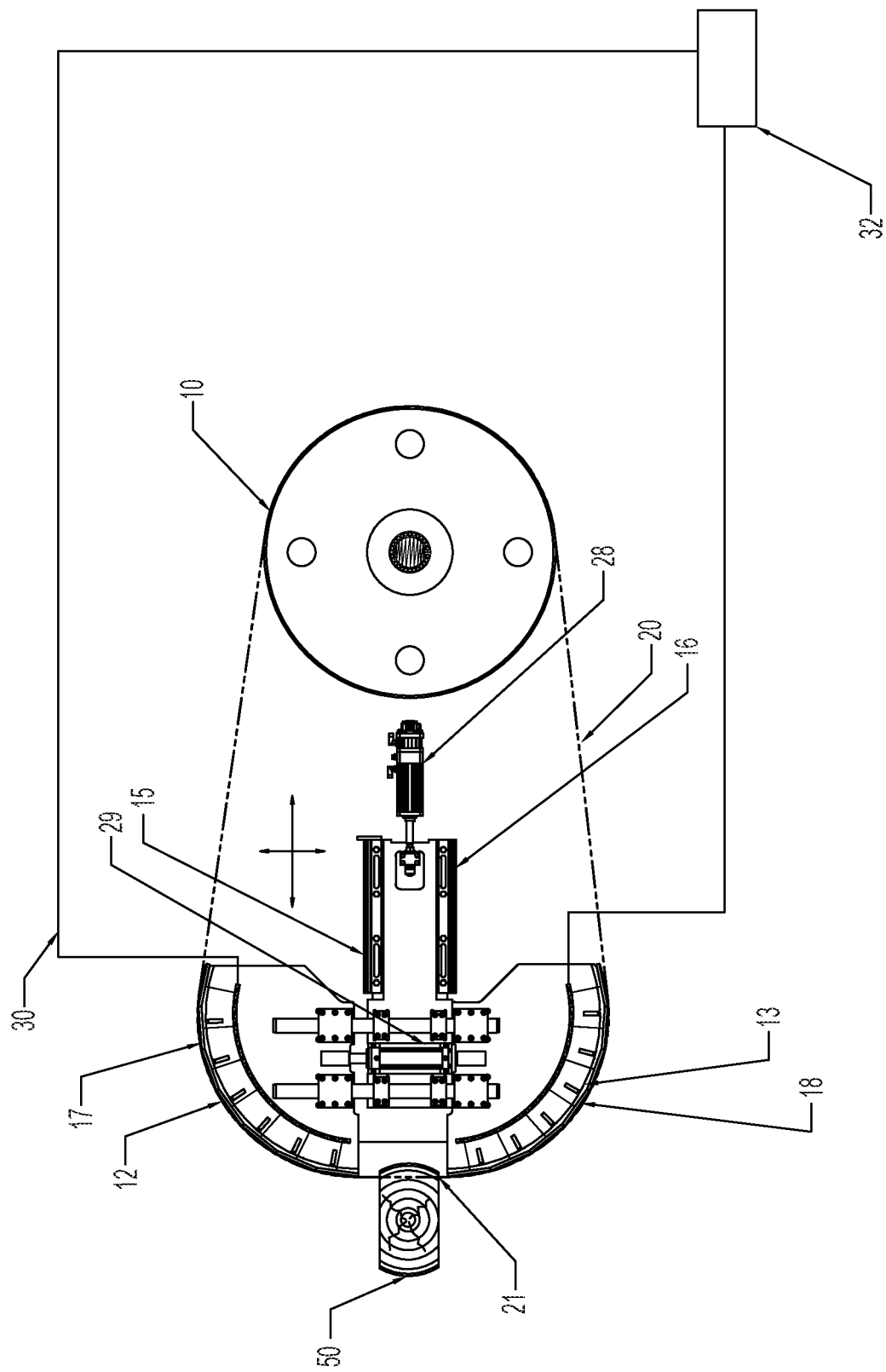
FIG. 2 illustrates a side view of exemplary band saws 1 according to the present invention.
Figure 3:
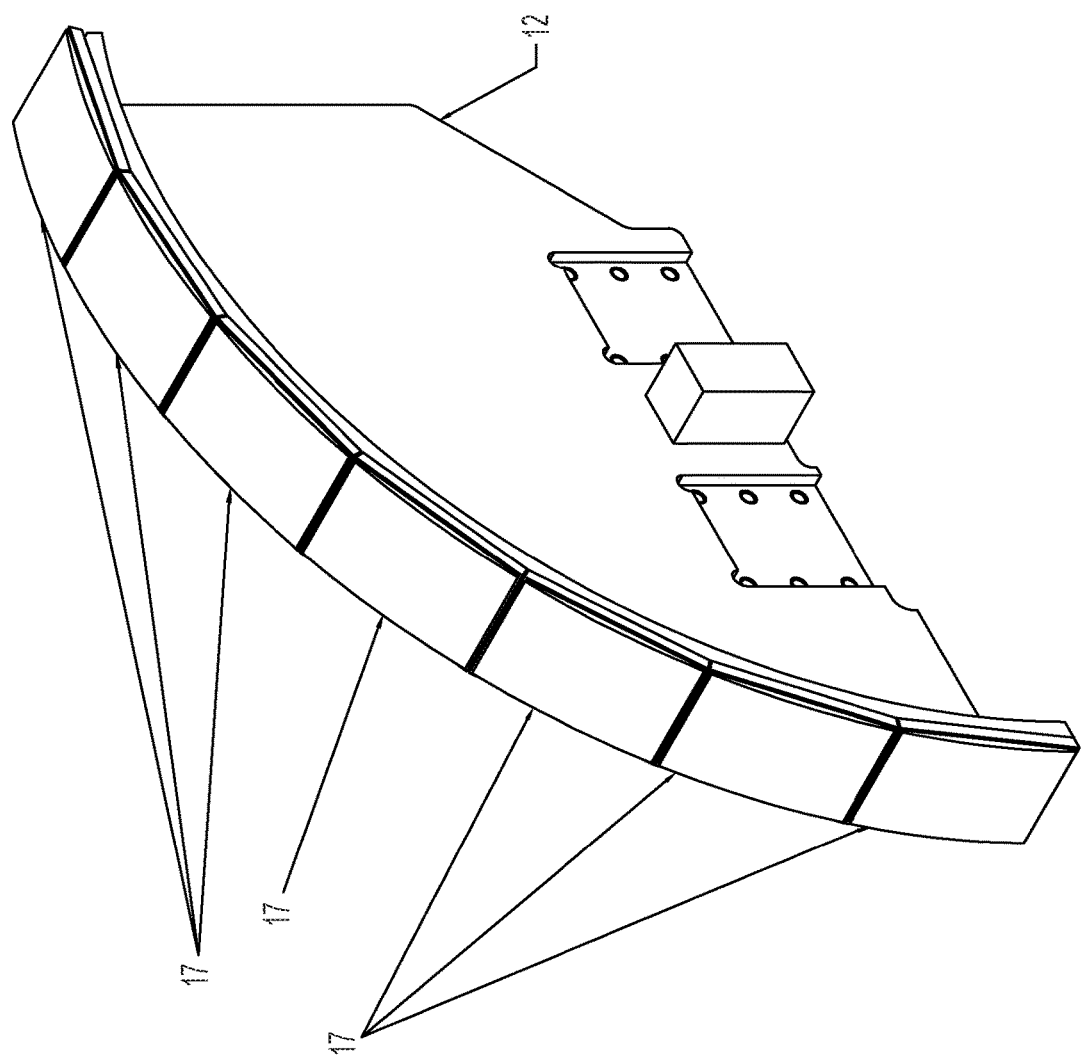
FIG. 3 illustrates a support arm.
Figure 4:
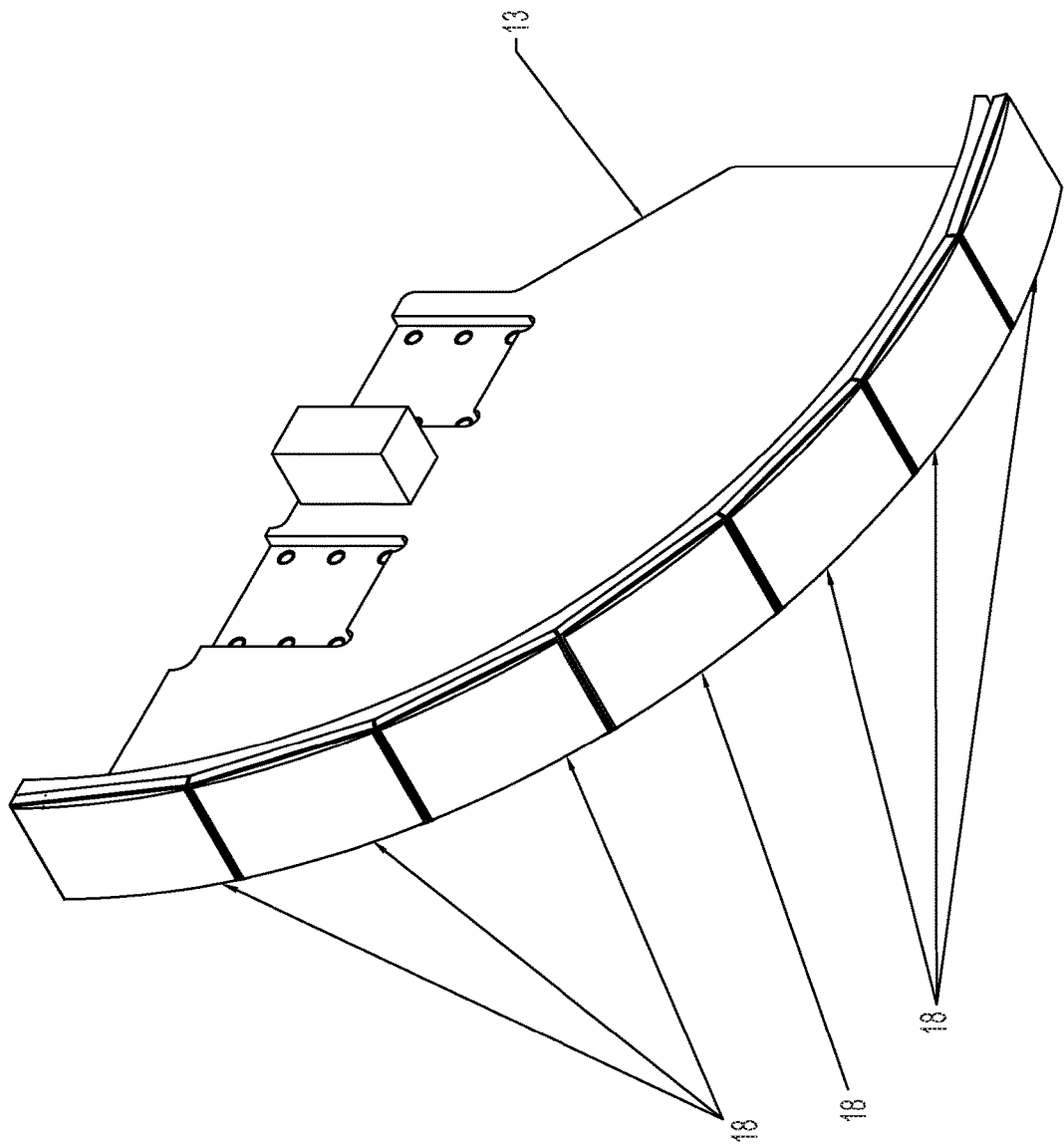
FIG. 4 illustrates a support arm.
Figure 5:
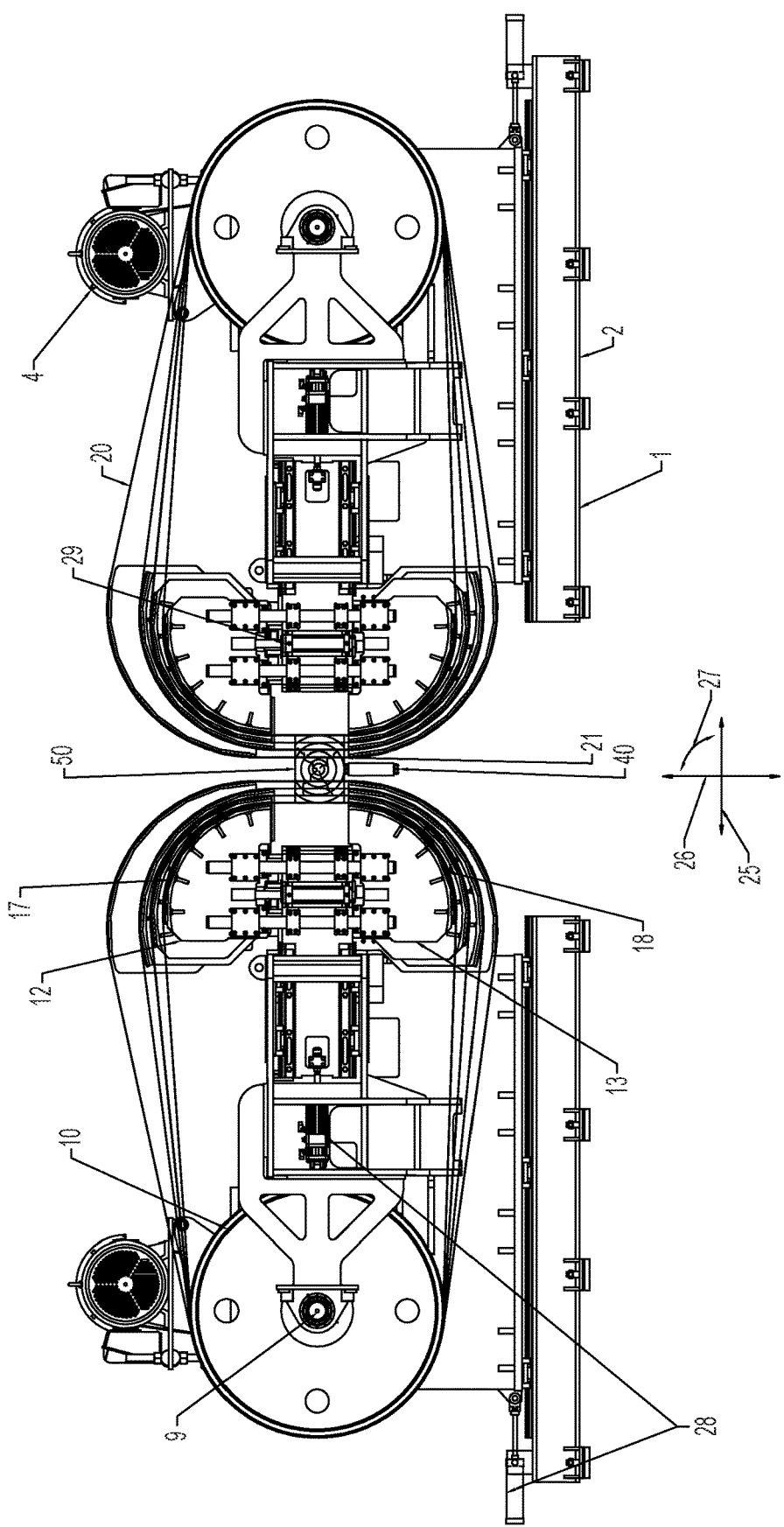
FIG. 5 illustrates the use of a plurality of band saws 1 in a method according to the present invention.

The inventions will now be explained with reference to the attached non-limiting drawings. Referring to FIGS. 1-5, wherein like numerals designate corresponding parts throughout the several views, a pair of opposing band saws 1 constructed to cut cant 50 travelling on a conveyor 40. Each band saw 1 comprises a support 2, a motor 4 mounted on the support 2, a motor pulley 6 driven by the motor 4, a drive wheel pulley 8 connected to the motor pulley 6 by a belt 5, the drive wheel pulley 8 being mounted to a drive wheel axle 9, a drive wheel 10 being mounted to the drive wheel axle 9, a first support arm 12, a second support arm 13, a first locking structure 15 connecting the first support arm 12 to the support 2, a second locking structure 16 connecting the second support arm 13 to the support 2, and a band saw blade 20 supported by the drive wheel 10, the first support arm 12 and second support arm 13. While first and second support arms 12 and 13 are shown, more than two support arms may be utilized as shown in FIG. 5, and each additional support arm can have an associated locking structure. More than two support arms 12 and 13 can also be utilized in the same saw 1 as desired. Any number of saws 1 can be utilized, with two opposing saws 1 being preferred.

The first support arm 12 comprises a first porous media bearing 17. The second support arm 13 comprises a second porous media bearing 18. The porous media bearings 17 and 18 are connected to a source of lubricant 32 so that during use pressure can be applied to lubricant 30 so that the lubricant 30 flows through the porous media bearings 17 and 18 to provide a layer of lubricant 30 between the band saw blade 20 and the porous media bearings 17 and 18. The lubricant 30 can comprise compressed air or gas and/or a fluid, from a source of lubricant 32. The amount of pressure used for the lubricant 30 can depend on the weight of the band saw blade 20 and the tension under which the band saw blade 20 is operating as will be apparent to those skilled in this technology.

The porous media bearing 17 can be any suitable structure that allows the lubricant 30 to pass through the porous media bearing 17 and form a layer of lubricant 30 between the band saw blade 20 and the surface of the porous media bearing 17. Examples of suitable porous media bearings are commercially available at www.newwayairbearings.com, www.ibspe.com, and www.nelsonair.com, which are incorporated herein by reference. A preferred porous media bearing 17 is formed from carbon, and more preferably, graphite. Porous carbon is one of the best materials for this purpose, producing an ideal supply of uniform air pressure across the face of the bearing while automatically restricting and damping the air flow at the same time. The carbon surface also provides greater bearing protection if there is an air supply failure, and allows the bearings to be moved during air failure without damaging the support surface.

While not preferred, the bearing 17 can be created using orifices, if desired, as shown in my previous U.S. Pat. No. 8,151,680, the complete disclosure of which is incorporated herein by reference. Precisely sized orifices can be formed on the bearing and combined with grooves to distribute the pressurized lubricant 30 evenly across the bearing face. However, if the bearing face becomes scratched across a groove or near an orifice, the volume of lubricant 30 that escapes may be more than the orifice can supply, causing the bearing to crash even with a normal supply pressure. Rather than the small number of orifices of conventional air bearings, porous media bearings control the airflow across the entire bearing surface through numerous, such as millions of, holes in the porous material. Because of this, porous media bearings are harder to clog and will still fly even after being severely scratched.

The first locking structure 15 is constructed to move the first support arm 12 in the horizontal 25 direction or plane and move the first support arm 12 in the vertical 26 direction or plane. The first locking structure 15 can also tilt 27 the first support arm 12 in relation to the drive wheel 10. The second locking structure 16 is constructed to move the second support arm 13 in the horizontal 25 direction or plane and move the second support arm 13 in the vertical 26 direction or plane. The second locking structure can also tilt 27 the second support arm 13 in relation to the drive wheel 10. The horizontal 25 direction or plane can be perpendicular to the vertical 26 direction or plane The location of the cutting section 21 of the blade 20 can be adjusted by moving the first and second support arms 12, 13 in the horizontal 25 direction or plane. Thus, when using multiple blades 20, the location of the cutting section 21 of each blade can adjusted to provide multiple simultaneous cuts in the cant, as shown in FIG. 5.

The angle of the blade 20 in the cutting section 21 can be adjusted by moving the first and second support arms 12, 13 in the horizontal 25 direction or plane in opposing directions to each other. Thus, the angle of the blade 20 in the cutting section 21 can be perpendicular to the horizontal 25 direction or plane, or adjusted to be any desired angle.

The tension on the blade 20 can be adjusted by moving the first and second support arms 12, 13 in opposing directions, for example in the vertical 26 direction or plane. The tension on the blade 20 can be increased by moving the first and second support arms 12, 13 away from each other and the tension can be decreased by moving the first and second support arms 12, 13 closer to each other.

Centering of the blade 20 on the support arms 12, 13 can be adjusted by adjusting the tilt 27 of the first and second support arms 12, 13 in relation to the drive wheel 10. Center of band saw blades 20 is now well known and any centering method can be utilized, such as angled surfaces and/or tilting of the support arms 12, 13. The tilt 27 can be in any desired direction to effect centering of the blade 20 on the bearings 17, 18.

The parts of the saw 1 can be formed of any suitable material, such as metals, composites, and polymers.

Being able to move the first and second support arms 12, 13 in relation to each other in both horizontal 25 and vertical 26 directions or planes greatly simplifies the required number of parts and cost. The same size drive wheels 10 and band saw blades 20 can be utilized to provide multiples cuts in different locations on the cant. The location of the cuts into the cant 50 can be adjusted by moving the first and second support arms 12, 13 in the horizontal 25 direction or plane and the tension on the band saw blade 20 can be adjusted by moving the first and second support arms 12, 13 in opposing directions in the vertical 26 direction or plane.

Preferably, each band saw 1 comprises a plurality of band saw blades 20 so that multiple cuts in the cant 50 can be perform at the same time, as shown in FIG. 5. Each band saw blade 20 has associated first and second support arms 12, 13 and drive wheel 10 so that the plurality band saw blades 20 can be set in different positions in relation to each other, for example in the blades 20 can be spaced out from each other in the horizontal 25 direction or plane. The band saw blades 20 are continuous loops and any suitable conventional band saw blade can be utilized in the present invention.

The first and second locking structures 15, 17, each include an associated horizontal positioner 28 and a vertical positioner 29. The horizontal and vertical positioners 28 and 29 can comprise hydraulic cylinders, ball screw, electric motors, or any other suitable type of actuator. Positioners 28, 29 are now well known in the art and any suitable positioner 28, 29 can be utilized to move the support arms 12, 13.

A computer control system 60 comprising at least one cant detector 62 is in communication with the band saw. The system 60 controls operation of the band saw including individual control of each horizontal positioner 28 and each vertical positioner 29. An example of a cant detector 62 is a laser scanner constructed to measure the dimensions and location of the cant 50 approaching the band saw. The measurements taken by the cant detector 62 can be used by the computer control system 60 to determine how to form the most boards from the cant 50, move the cant 50 onto the conveyor 40 in the correct position for cutting, and to move the cutting sections 21 into the correct positions for making the cuts. Computer systems 60 are now well known and any suitable computer system can be utilized.

To effect cutting, the cant 50 travelling on a conveyor 40 can be fed against a cutting edge of the band saw blade(s) 20 in the cutting section(s) 21. During operation, a lubricant 30 comprising compressed gas and/or a fluid, from a source of lubricant 32 can be sent through the porous media bearings 17, 18 to float the band saw blade 20 off of the porous media bearings 17 and 18.

If desired, cuts in the cant 50 can be conducted between the drive wheel 10 and a support arm 12 or 13.

The invention is not limited to the specific examples shown in the drawings. A main teaching of the present invention is that at least two support arms each having a porous media bearing are configured to move in at least to directions so that the location of the cuts into the cants can be moved by moving the at least two support arms in a same direction and tension on the blade can adjusted by moving the at least two support arms towards/away from each other, so that same size blades can be utilized to provide different cut locations in the cant. Prior art methods require different size blades to provide different cut locations in the cant. Furthermore, the present invention is capable of providing precise adjustments to the cut location in the cant and the angle of the cut in the cant in real time. Any number of support arms can be utilized as desired.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A saw configured to cut cant comprising at least one band saw comprising:
   a motor;
   at least one drive wheel configured to be driven by the motor;
   at least one first support arm comprising a first porous media bearing;
   at least one second support arm comprising a second porous media bearing;
   at least one first locking structure connecting the first support arm to the support, the first locking structure constructed to move the first support arm in a horizontal direction and a vertical direction when unlocked and lock the first support in a desired position;
   at least one second locking structure connecting the second support arm to the support, the second locking structure constructed to move the second support arm in the horizontal direction and the vertical direction when unlocked and lock the second support in a desired position; and
   at least one continuous loop band saw blade supported by the drive wheel, the first support arm and the second support arm, wherein a cutting section of the band saw blade being defined between the first and second support arms, the cutting section receives the cant which is cut by the band saw blade, the first porous media bearing having a curved surface for changing a direction of the band saw blade during use, the second porous media bearing having a curved surface for changing a direction of the band saw blade during use, the cutting section can be adjusted by moving the first and second support arms in the horizontal direction, and a tension on the band saw blade can be adjusted by moving the first and second support arms in opposing directions in the vertical direction so that the tension can be increased by moving the first and second support arms to be farther apart and the tension can be decreased by moving the first and second support arms closer together.

2. The saw according to claim 1, wherein an angle of the band saw blade is adjusted by moving the first and second arms in relation to each other.

3. The saw according to claim 1, wherein the first locking structure tilts the first support arm in relation to the drive wheel to allow centering of the band saw blade on the first porous media bearing and the second locking structure tilts the second support arm in relation to the drive wheel to allow centering of the band saw blade on the second porous media bearing.

4. The saw according to claim 1, further comprising a plurality of the band saw blades and a plurality of the drive wheels, each band saw blade being supported by an associated drive wheel and first and second support arms.

5. The saw according to claim 4, wherein a first band saw blade and a second band saw blade are a same size, the first band saw blade has a first cutting section, the second band saw blade has a second cutting section, and the first cutting section being in a different location than the second cutting section.

6. The saw according to claim 1, further comprising a source of lubricant connected to the first porous media bearing surface and to the second porous media bearing surface permitting the band saw blade to float on a layer of lubricant between the first porous media bearing and the band saw blade and a layer of lubricant between the second porous media bearing and the band saw blade.

7. The saw according to claim 6, wherein the source of lubricant comprises compressed air or oil.

8. The saw according to claim 1, comprising opposing first and second band saws.

9. The saw according to claim 1, wherein the first locking structure comprises a first horizontal positioner and a first vertical positioner, and the second locking structure comprises a second horizontal positioner and a second vertical positioner.

10. The saw according to claim 9, wherein the first and second horizontal positioners and the first and second vertical positioners each comprise at least one of hydraulic cylinders, ball screws, or electric motors.

11. A system for cutting cant comprising:
   at least one band saw comprising:
      a motor;
      at least one drive wheel configured to be driven by the motor;
      at least one first support arm comprising a first porous media bearing;
      at least one second support arm comprising a second porous media bearing;
      at least one first locking structure connecting the first support arm to the support, the first locking structure constructed to move the first support arm in a horizontal direction and a vertical direction when unlocked and lock the first support in a desired position;
      at least one second locking structure connecting the second support arm to the support, the second locking structure constructed to move the second support arm in the horizontal direction and the vertical direction when unlocked and lock the second support in a desired position; and
      at least one continuous loop band saw blade supported by the drive wheel, the first support arm and the second support arm, wherein a cutting section of the band saw blade being defined between the first and second support arms, the cutting section receives the cant which is cut by the band saw blade, the first porous media bearing having a curved surface for changing a direction of the band saw blade during use, the second porous media bearing having a curved surface for changing a direction of the band saw blade during use, the cutting section can be adjusted by moving the first and second support arms in the horizontal direction, and a tension on the band saw blade can be adjusted by moving the first and second support arms in opposing directions in the vertical direction so that the tension can be increased by moving the first and second support arms to be farther apart and the tension can be decreased by moving the first and second support arms closer together; and
   a computer system in communication with the first and second locking structures, the computer system being configured to independently control movements of the first and second support arms in the horizontal and vertical directions.

12. The system according to claim 11, wherein the first locking structure tilts the first support arm in relation to the drive wheel to allow centering of the band saw blade on the first porous media bearing and the second locking structure tilts the second support arm in relation to the drive wheel to allow centering of the band saw blade on the second porous media bearing.

13. The system according to claim 11, further comprising a plurality of band saw blades and a plurality of drive wheels, each band saw blade being supported by an associated drive wheel and first and second support arms.

14. The system according to claim 11, wherein a first band saw blade and a second band saw blade are a same size, the first band saw blade has a first cutting section, the second band saw blade has a second cutting section, and the first cutting section being in a different location than the second cutting section.

15. The system according to claim 11, further comprising a conveyor that conveys the cant through the cutting surface of the band saw.

16. The system according to claim 15, further comprising a cant detector in communication with the computer system.

17. The system according to claim 16, wherein the cant detector measures dimensions of the cant and a location of the cant approaching the band saw.

18. The system according to claim 17, wherein the computer system determines how to form boards from the cant based on dimensions of the cant.

19. A method of using a band saw to cut cant comprising:
   providing at least one band saw comprising:
      a motor;
      at least one drive wheel configured to be driven by the motor;
      at least one first support arm comprising a first porous media bearing;
      at least one second support arm comprising a second porous media bearing;
      at least one first locking structure connecting the first support arm to the support, the first locking structure constructed to move the first support arm in a horizontal direction and a vertical direction when unlocked and lock the first support in a desired position;
      at least one second locking structure connecting the second support arm to the support, the second locking structure constructed to move the second support arm in the horizontal direction and the vertical direction when unlocked and lock the second support in a desired position; and
      at least one continuous loop band saw blade supported by the drive wheel, the first support arm and the second support arm, wherein a cutting section of the band saw blade being defined between the first and second support arms, the cutting section receives the cant which is cut by the band saw blade, the first porous media bearing having a curved surface for changing a direction of the band saw blade during use, the second porous media bearing having a curved surface for changing a direction of the band saw blade during use, the cutting section can be adjusted by moving the first and second support arms in the horizontal direction, and a tension on the band saw blade can be adjusted by moving the first and second support arms in opposing directions in the vertical direction so that the tension can be increased by moving the first and second support arms to be farther apart and the tension can be decreased by moving the first and second support arms closer together;
   supplying pressurized lubricant to the first and second porous media bearings; and
   conveying cant on a conveyor, and
   operating the at least one band saw to cut the cant.

20. The method according to claim 19, further comprising providing a plurality of band saws in which cutting sections of each band saw are spaced apart, and operating the conveyor to provide multiple simultaneous cuts in the cant.

21. The method according to claim 20, wherein the plurality of band saws have a same size.

22. The method according to claim 19, further comprising moving the first and second arms in opposing directions in the vertical direction to adjust the tension on the band saw blade.

23. The method according to claim 19, further comprising moving the first and second arms in opposing directions in the horizontal direction to adjust an angle of the band saw blade in the cutting section.

24. The method according to claim 19, further comprising moving the first and second arms in the horizontal direction to move the location of the cutting section.

* * * * *